United States Patent
Harouche et al.

(10) Patent No.: US 10,332,224 B2
(45) Date of Patent: *Jun. 25, 2019

(54) REMOTE DEVICE CONTENT AND LEARNING MANAGEMENT SYSTEM AND METHOD

(71) Applicant: Multimedia Plus, Inc., New York, NY (US)

(72) Inventors: David Harouche, Great Neck, NY (US); Gregory Patrick Orsi, Astoria, NY (US)

(73) Assignee: Multimedia Plus, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,868

(22) Filed: Aug. 9, 2018

(65) Prior Publication Data

US 2018/0350017 A1 Dec. 6, 2018

Related U.S. Application Data

(63) Continuation of application No. 14/639,558, filed on Mar. 5, 2015, now Pat. No. 10,049,417.

(51) Int. Cl.
*H04L 29/08* (2006.01)
*G06Q 50/20* (2012.01)
(Continued)

(52) U.S. Cl.
CPC ......... *G06Q 50/2057* (2013.01); *H04L 67/10* (2013.01); *H04L 67/1044* (2013.01);
(Continued)

(58) Field of Classification Search
CPC . G06F 17/30; G06F 9/445; G06F 9/44; G06F 9/45; G09B 7/00; H04L 29/08; G06Q 30/00

See application file for complete search history.

(56) References Cited

U.S. PATENT DOCUMENTS 6,514,079 B1 * 2/2003 McMeninnen .......... G09B 7/02
434/219
7,293,025 B1 * 11/2007 Harouche ................ G09B 7/00
(Continued)

FOREIGN PATENT DOCUMENTS

EP 0841615 A2 5/1998

OTHER PUBLICATIONS

Learn it Campus Interactive Scenario-Based Training, www.learnitcampus.com, date: unknown.
(Continued)

*Primary Examiner* — Aftab N. Khan
(74) *Attorney, Agent, or Firm* — Kane Kessler, P.C.; Barry E. Negrin

(57) ABSTRACT

A system and method of providing centrally updatable digital content on local electronic devices via a remote device content and learning management system is provided. At least one media server is provided having central high bandwidth content resident thereon, at least intermittently communicatable with at least one local electronic device. The local device is populatable with the central high bandwidth content as an instance of local high bandwidth content. The local high bandwidth content is compared to the central high bandwidth content, and the currentness of the local high bandwidth content is determined with respect to the central high bandwidth content. The local high bandwidth content is updated if it is determined to be not current with respect to the central high bandwidth content via downloading newer content from the media server to the local electronic device. The system is preferably app-based.

25 Claims, 14 Drawing Sheets

(51) Int. Cl.
    *H04N 21/45*    (2011.01)
    *H04N 21/466*    (2011.01)

(52) U.S. Cl.
    CPC ........... *H04N 21/45* (2013.01); *H04N 21/466* (2013.01); *H04L 67/1095* (2013.01)

(56) References Cited

U.S. PATENT DOCUMENTS

| | | | | |
|---|---|---|---|---|
| 8,607,221 | B1* | 12/2013 | Donahue | G06F 8/65 717/173 |
| 2002/0106622 | A1 | 8/2002 | Osborne et al. | |
| 2002/0160350 | A1* | 10/2002 | Tanaka | G09B 5/08 434/350 |
| 2004/0215755 | A1* | 10/2004 | O'Neill | G06F 8/654 709/223 |
| 2004/0267607 | A1 | 12/2004 | Maddux | |
| 2005/0125353 | A1* | 6/2005 | Schlesinger | G09B 5/00 705/51 |
| 2006/0230415 | A1* | 10/2006 | Roeding | H04N 7/173 725/34 |
| 2009/0133071 | A1* | 5/2009 | Sakai | H04N 5/4403 725/46 |
| 2012/0173564 | A1* | 7/2012 | Rao | H04L 67/1097 707/769 |
| 2012/0301863 | A1* | 11/2012 | Bijlani | G09B 19/00 434/362 |
| 2013/0332916 | A1* | 12/2013 | Chinn | G06F 8/65 717/169 |
| 2014/0074663 | A1* | 3/2014 | Alsina | G06Q 30/0601 705/27.1 |
| 2014/0074783 | A1* | 3/2014 | Alsina | G06Q 10/10 707/624 |

OTHER PUBLICATIONS

Georgio Armani Streamlines Employee Training and Boosts Efficiency with Outsourced Interactive Learning Tool, Stores, Date: Nov. 2002.
PCT International Application No. PCT/US16/17352—International Search Report and Written Opinion dated Apr. 22, 2016.

* cited by examiner

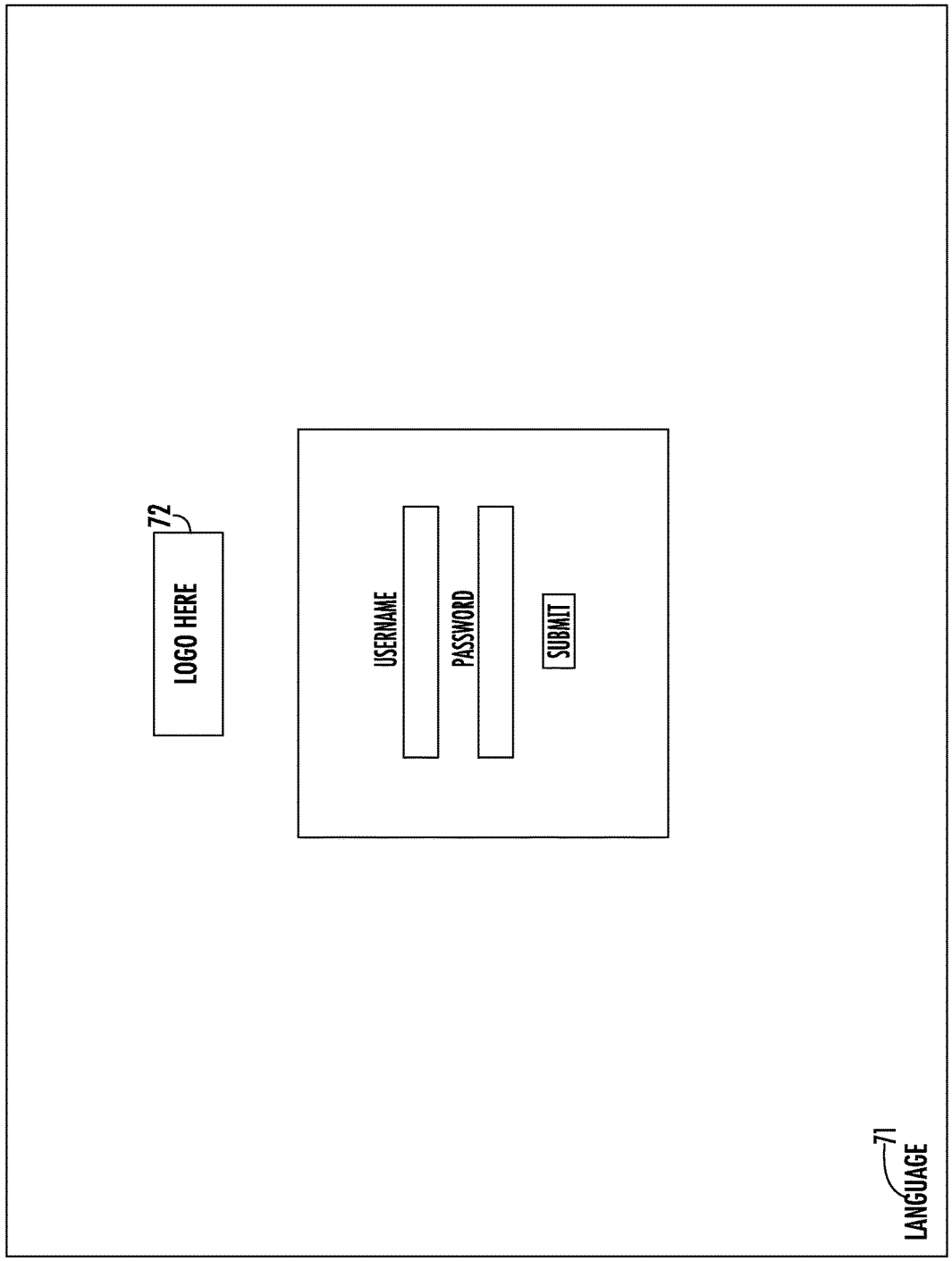

LOGO HERE 72

WELCOME FIRST NAME LAST NAME
BELOW IS A LIST OF PROGRAMS YOU ARE ELIGIBLE TO VIEW.
WHEN YOU COMPLETE A PROGRAM, IT WILL BE MARKED WITH A CHECK.

75–100% ▲ ☑ PROGRAM 1 — 74
▶ ☐ PROGRAM 2
97% ☐ MODULE 1
☐ MODULE 2 — 76
☐ MODULE 3
☐ MODULE 4
☐ MODULE 5
▲ ☐ PROGRAM 3 — 74
▲ ☐ PROGRAM 4
▲ ☐ PROGRAM 5

PROGRAM SCORES: VISIBLE

LANGUAGE          LOGOUT    EXIT

LOGO HERE

53%

☑ MODULE 1
☐ MODULE 2
HEADER
  ☑ SECTION 1
  ☑ SECTION 2
  ☑ SECTION 3
    ☑ SUBSECTION 1
    ☑ SUBSECTION 2
    ☑ SUBSECTION 3
  ☐ ASSESSMENT
☐ MODULE 3
☐ MODULE 4
☐ MODULE 5

QUIZ

ONCE YOU BEGIN THIS SECTION, YOU MUST COMPLETE ALL OF THE QUESTIONS. YOUR RESPONSES WILL ONLY BE RECORDED UPON YOUR FIRST PASSING COMPLETION OF THIS QUIZ

CONTINUE

80

HOME  LOGOUT  EXIT

*FIG. 3E*

LOGO HERE

MODULE 1
MODULE 2
HEADER
  SECTION 1
  SECTION 2
  SECTION 3
    SUBSECTION 1
    SUBSECTION 2
    SUBSECTION 3
  ASSESSMENT
MODULE 3
MODULE 4
MODULE 5

53%     1/5

QUIZ

QUESTION GOES HERE? —81

A   NOT SELECTED
B X SELECTED          } —82
C   NOT SELECTED
D   NOT SELECTED

FEEDBACK TEXT —83

CONTINUE

HOME  LOGOUT  EXIT

*FIG. 3F*

LOGO HERE

53%

QUIZ                                                    5/5

☑ MODULE 1
☐ MODULE 2
HEADER
  ☑ SECTION 1
  ☑ SECTION 2
  ☑ SECTION 3
    ☑ SUBSECTION 1
    ☑ SUBSECTION 2
    ☑ SUBSECTION 3
  ☐ ASSESSMENT
☐ MODULE 3
☐ MODULE 4
☐ MODULE 5

SCORE 80%

YOU ANSWERED 4/5 QUESTIONS CORRECTLY.

YOUR RESULTS WILL BE RECORDED AND YOU MAY PROCEED.

[CONTINUE]

HOME   LOGOUT   EXIT

*FIG. 3G*

| WELCOME | LOG OUT | | | |
|---|---|---|---|---|
| HOME | LANGUAGE | | | |

YOUR COMPANY LOGO

SEARCH BY INDIVIDUAL
HOME

RESULTS AS OF JANUARY 01, 2013 - 1:00:00 PM

| STORE | EMPLOYEE |

PROGRAMS
ORIENTATION
RECRUITMENT & SELECTION
SERVICE & SELLING
PRODUCT REFERENCE RESOURCES

EMPLOYEE 1 REPORT CARD

SEARCH EMPLOYEE 🔍

EMPLOYEE 2
308 RFT KEYHOLDER

EMPLOYEE NUMBER: 123456
HIRE DATE: 11/5/2012

STORE NUMBER: 0308
STORE NAME: 0308-STORE 002

| PROGRAMS | STARTED | COMPLETED | STORE |
|---|---|---|---|
| ORIENTATION | 01/10/13 6:22 PM | 01/16/13 12:34 PM | 100 |
| ▸ WHO WE ARE | 01/10/13 6:22 PM | 01/16/13 10:30 AM | 100.00 |
| ▸ THE CUSTOMER EXPERIENCE | 01/16/13 10:32 AM | 01/16/13 10:55 AM | 100.00 |
| ▸ OUR CLIENTS | 01/16/13 10:56 AM | 01/16/13 11:19 AM | 100.00 |
| ▸ SALES SUPPORT | 01/16/13 11:20 AM | 01/16/13 12:12 PM | 100.00 |
| ▸ YOUR ROLE | 01/16/13 12:12 PM | 01/16/13 12:34 PM | 100.00 |
| SERVICE & SELLING | 01/10/13 6:38 PM | 01/10/13 8:21 PM | 100 |
| ▸ PASSION FOR THE CUSTOMER | 01/10/13 6:38 PM | 01/10/13 7:54 PM | 100.00 |
| ▸ CONNECT WITH THE CUSTOMER | 01/10/13 7:54 PM | 01/10/13 8:04 PM | 100.00 |
| ▸ STYLE THE CUSTOMER | 01/10/13 8:04 PM | 01/10/13 8:12 PM | 100.00 |
| ▸ CLIENTELING | 01/10/13 8:12 PM | 01/10/13 8:21 PM | 100.00 |
| RECRUITMENT & SELECTION | 01/12/13 10:42 AM | NOT COMPLETED | |
| ▸ RECRUITMENT PROCESS | 01/12/13 10:42 AM | 01/12/13 11:03 AM | 100.00 |
| ▸ SOURCING CANDIDATES | 01/12/13 11:03 AM | NOT COMPLETED | |

*FIG. 4D*

REMOTE DEVICE CONTENT AND LEARNING MANAGEMENT SYSTEM AND METHOD

RELATED APPLICATIONS

Priority is claimed from U.S. patent application Ser. No. 14/639,558, filed Mar. 5, 2015, entitled "Remote Device Content and Learning Management System and Method", and issuing on Aug. 14, 2018 as U.S. Pat. No. 10,049,417, the entirety of which is incorporated by reference herein.

BACKGROUND OF THE INVENTION

Field of the Invention

The invention relates to corporate content such as corporate training programs and more specifically to methods and systems for disseminating corporate content and tracking the results of retail, service, or other similar training and communication programs and similar interactive corporate content.

Description of Related Art

Distributing corporate content, such as training systems, product information, and the like (e.g., for training employees on various aspects of a company's policies, products, and procedures) is an important human resource issue for large retail, restaurant, automotive, hospitality, service, and other dispersed-workforce corporations. A system must be in place to insure that employees in different stores or outlets receive the same or similar training so that the corporate identity of the company is preserved and so that the company can be certain that each location is meeting at least the minimum levels of acceptable training and receiving communication.

Previous methods of conveying such information to employees include the use of a manual and the use of speakers to large groups of employees. The former is largely ineffective for several reasons. Typically, a corporate manual is many pages long, and the employee has little interest in reading it. Further, the company has little assurance that the employee will actually read the manual. While an employee may be asked to sign a statement indicating that he or she read the manual, such a mechanism provides little assurance of an actual reading of the manual by the employee.

The latter method, providing a speaker to an assembly of employees, also has several drawbacks. While it is simple enough to take attendance at such an event, there is no guarantee that an employee will actually retain anything taught at the assembly. Further, for extremely large companies, either the company must rent out an enormous assembly area for the assembly or the speaker or speakers must perform the same program multiple times for different audiences. Neither of these methods is very efficient.

Another way companies have been training their employees is via videotaped presentations or presentations made on CD, DVD, or other media. This is a significant improvement to the above-described methods for several reasons. First, the employees can be trained in small groups or even individually at the stores themselves or in an office or conference room as opposed to a large assembly space or convention center. Because the training program is fixed in a reusable medium, the program itself need only be recorded once, and a number of copies of the training program may be distributed to each store or outlet. Further, each location can use its copy of the training program periodically, e.g., annually, or every time a new employee is hired, or the like. Finally, since each employee can be shown the training program at the convenience of the company, a contemporaneous quiz or test may be administered to the employee either during the training program or immediately or shortly thereafter. By later grading the employee's quiz or test, the company can determine how effective the training program was by seeing precisely how much material the employee absorbed. Such a method is described in U.S. Pat. No. 6,514,079 to McMenimen et al., the teachings of which are incorporated by reference herein.

Despite the advantages offered by recorded training programs, drawbacks remain in conventional systems. First, the tracking of employee test data can be laborious and difficult, particularly if a company has many hundreds or thousands of employees. It would be desirable though difficult to be able to sort test data by any number of different variables, such as by employee, by store, by training program (assuming more than one program is provided), and the like. To do so using conventional systems, test data would have to be entered into a central database in a sortable manner, quite a labor-intensive task for large companies. Also, if the tests are administered either in groups or serially to individual employees, at least some employees are likely to cheat, either by directly asking a colleague what an answer was, or by watching him take the test. Store managers can also aid and abet in cheating by giving their employees the answers to raise the overall score of their respective stores. Additionally, since many businesses are not static but dynamic in nature (i.e., changing all the time), corporate content must also be readily and easily updatable. However, once corporate content is put on a CD, DVD, or the like, a new CD, DVD, etc. must be shipped to each location. Not only is this practice wasteful and inefficient, but this may lead to certain locations not receiving the updated materials, using the wrong/outdated materials, or the like.

Certain conventional employee training systems place their training programs on a central computer that is accessible remotely. This insures that every employee is accessing the same program, however it requires a robust connection between each local computer and the server to handle the amount of data being transmitted (namely, the entire training program). If a program is mere text, this is not as much of a problem, however majority rapidly growing number of training programs incorporate full-motion video, which would require significant bandwidth over the communications link. For large companies, the server would also necessarily be very robust so as to handle numerous connections simultaneously. For dispersed-workforce companies, connectivity bandwidth at satellite locations is limited and used primarily for mission-critical data and operations such as credit card authorization, merchandise lookup, and the like. Having one or more employees streaming high bandwidth corporate content on one or more local desktops, tablets, smartphones, or similar portable electronic devices (be they company issued or otherwise) will interfere with those mission-critical operations and result in choppy or unwatchable corporate content.

SUMMARY OF THE INVENTION

The invention is a content and learning management system, method, and non-transitory computer-readable medium including instructions for providing centrally updatable digital content on local electronic devices.

The system includes at least one media server having central high bandwidth content resident thereon, and at least one local electronic device at least intermittently communicatable with the media server, adapted to be populatable with the central high bandwidth content as an instance of local high bandwidth content, and having a user interface and a computer executable program to play the local high bandwidth content for a user via the user interface. The computer executable program includes a comparator adapted to compare the local high bandwidth content to the central high bandwidth content to determine the currentness of the local high bandwidth content with respect to the central high bandwidth content. The program also includes an updater for updating the local high bandwidth content if the local high bandwidth content is determined to be not current with respect to the central high bandwidth content via the computer executable program downloading newer content from the media server to the local electronic device. Users of the content and learning management system access the local high bandwidth content via the user interface. Preferably, the local electronic device is a mobile/personal electronic device such as a laptop computer, notebook computer, smartphone, smartwatch, tablet, or other similar device, and the computer executable program is an app or similar software thereon. The local electronic device may also be a desktop computer or similar less mobile electronic device. Preferably, the corporate content that is downloaded onto the local device is stored in the directory structure of the app itself.

The system further includes a central manifest file corresponding to the central high bandwidth content, and a local manifest file resident on the local electronic device, corresponding to the local high bandwidth content resident on the local electronic device. The comparator compares the local manifest file to the central manifest file to determine the currentness of the local high bandwidth content with respect to the central high bandwidth content. Preferably, the comparator compares the local manifest file to the central manifest file whenever a user logs into the computer executable program on the local electronic device. In addition or in the alternative, the comparator compares the local manifest file to the central manifest file periodically. The central manifest file preferably includes metadata related to the central high bandwidth content and the local manifest file comprising metadata related to the local high bandwidth content.

Preferably, the central high bandwidth content comprises primary content and secondary content. Optionally, a plurality of files of the secondary content corresponds to a single file of the primary content. The primary content file is typically larger than each of the secondary content files. As an example, the primary content includes video files or other large/high bandwidth files such as PowerPoint presentations or high resolution PDF documents, and the secondary content comprises at least one of i) a plurality of audio files corresponding to the video files or ii) a plurality of text files corresponding to the video files. The computer executable program preferably further includes a secondary content selector. Depending on which setting is selected in the secondary content selector, at least one of the plurality of files of the secondary content is downloaded to the local electronic device to correspond to the primary content file. As an example, each of the plurality of files of the secondary content is respectively in a different language, and the secondary content selector selects which language to download.

Preferably, the learning management system comprises a learning management system for training employees, each of the employees having a unique employee identifier. Preferably, the local high bandwidth content includes interactive content, and when an employee provides a response to the interactive content, the employee identifier and the response are communicated to the system. Optionally, a second server is provided communicatable with the local electronic devices and receiving the employee identifier and the response to the interactive content. Optionally, each of the employees provides at least one of the response to the interactive content to form a plurality of the responses, wherein the second server includes a computer executable results program adapted to tally and sort the plurality of the responses received from the employees.

The system preferably includes a plurality of the local electronic devices each having one of a respective plurality of the computer executable programs and each respectively populated with an instance of the central high bandwidth content as local high bandwidth content. A first of the plurality of local electronic devices is preferably communicatable with a second one of the plurality of local electronic devices and able to update a first instance of the local high bandwidth content on the first one of the plurality of local electronic devices from a second instance of the local high bandwidth content on the second one of the plurality of local electronic devices. Alternatively, a plurality of the local electronic devices are communicatable with each other, and each of the plurality of the local electronic devices is able to update its respective instance of local high bandwidth content from another of the local electronic devices.

Preferably, each of the users of the system is provided with a unique identifier, and the system makes only a portion of the local high bandwidth content available to a given user based on the user's the unique identifier, e.g., by rank in the company, by sector, by relevance to the users' respective jobs, etc. In addition or in the alternative, the computer executable program makes only a portion of the local high bandwidth content available to a given user based on the user's viewing progress of the local high bandwidth content, e.g., not allowing the user to view module/chapter 3 before completing module/chapter 2. Optionally, the system determines the user's viewing progress of the local high bandwidth content based at least in part on the user's the unique identifier. The system may preferably include a second server communicatable with the local electronic devices and receiving from the local electronic devices an indication of each user's viewing progress of the local high bandwidth content.

In addition to the abovementioned system, the invention includes a method of providing centrally updatable digital content on local electronic devices via a learning management system. The method includes the steps of: providing at least one media server having central high bandwidth content resident thereon; providing at least one local electronic device at least intermittently communicatable with the media server, adapted to be populatable with the central high bandwidth content as an instance of local high bandwidth content, and having a user interface and a computer executable program to play the local high bandwidth content for a user via the user interface; comparing the local high bandwidth content to the central high bandwidth content and determining the currentness of the local high bandwidth content with respect to the central high bandwidth content; updating the local high bandwidth content if the local high bandwidth content is determined to be not current with respect to the central high bandwidth content via downloading newer content from the media server to the local electronic device; and enabling users of the learning management system to access the local high bandwidth content via the user interface. Preferably, a local manifest file corresponding to the local high bandwidth content resident on the local electronic device is compared to a central manifest file corresponding to the central high bandwidth content to determine the currentness of the local high bandwidth content with respect to the central high bandwidth content. The comparing of the manifest files is performed either whenever a user logs into the computer executable program on the local electronic device, or periodically, or both.

Preferably, the central high bandwidth content includes primary content and secondary content, and a plurality of files of the secondary content are provided corresponding to a single file of the primary content. Optionally, video files are provided as the primary content; and at least one of i) a plurality of audio files corresponding to the video files or ii) a plurality of text files corresponding to the video files are provided as the secondary content. At least one of the plurality of files of the secondary content is selected to be downloaded to the local electronic device to correspond to the primary content file. As an example, each of the plurality of files of the secondary content may be provided in a different language.

In accordance with the inventive method, the users may include employees and the learning management system may include a learning management system for training the employees. As such, each of the employees may be provided with a unique identifier, and interactive content may be provided as part of the local high bandwidth content to which a user can provide a response. The unique identifier and the response are preferably communicated to the system upon an employee providing a response to the interactive content. A second server may be provided communicatable with the local electronic devices and receiving the employee identifier and the response to the interactive content. Since multiple employees will likely be using the system/method, each of the employees provide at least one response to the interactive content to form a plurality of the responses, the plurality of the responses received from the employees are preferably tallied and sorted.

Preferably, a plurality of the local electronic devices are provided communicatable with each other; and at least one of the plurality of the local electronic devices is able to update its instance of local high bandwidth content from another of the local electronic devices.

In several variations of the inventive method, each of the users is provided with a unique identifier. Optionally, only a portion of the local high bandwidth content is made available to a given user based on the user's unique identifier. In addition or in the alternative, only a portion of the local high bandwidth content is made available to a given user based on the user's viewing progress of the local high bandwidth content. Determining the user's viewing progress of the local high bandwidth content may optionally be based at least in part on the user's unique identifier. Preferably, each user's viewing progress of the local high bandwidth content is communicated to a second server, each user's viewing progress is preferably associated with each user's respective unique identifier. Optionally, only a portion of the local high bandwidth content is made available dependent on the user's viewing progress independently of a specific local electronic device. That is, the user can pick up where s/he left off in viewing/interacting with the content across multiple different devices because his/her progress is centrally recorded and associated with his/her unique identifier.

Similarly, the invention includes a non-transitory computer readable medium including instructions for providing centrally updatable digital content on local electronic devices in accordance with the method above.

BRIEF DESCRIPTION OF THE DRAWINGS

FIGS. 3A-G are exemplary screen shots of a computer executable program (e.g., an app) running on an employee's remote device in accordance with the invention.

FIGS. 4A-D are exemplary screen shots of a computer executable program running on an administrative device (remote or otherwise) in accordance with the invention.

DETAILED DESCRIPTION OF THE INVENTION AND DRAWINGS

Description will now be given with reference to the attached FIGS. 1-5. It should be understood that these figures are exemplary in nature and in no way serve to limit the scope of the invention, which is defined by the claims appearing hereinbelow.

Figure 1:
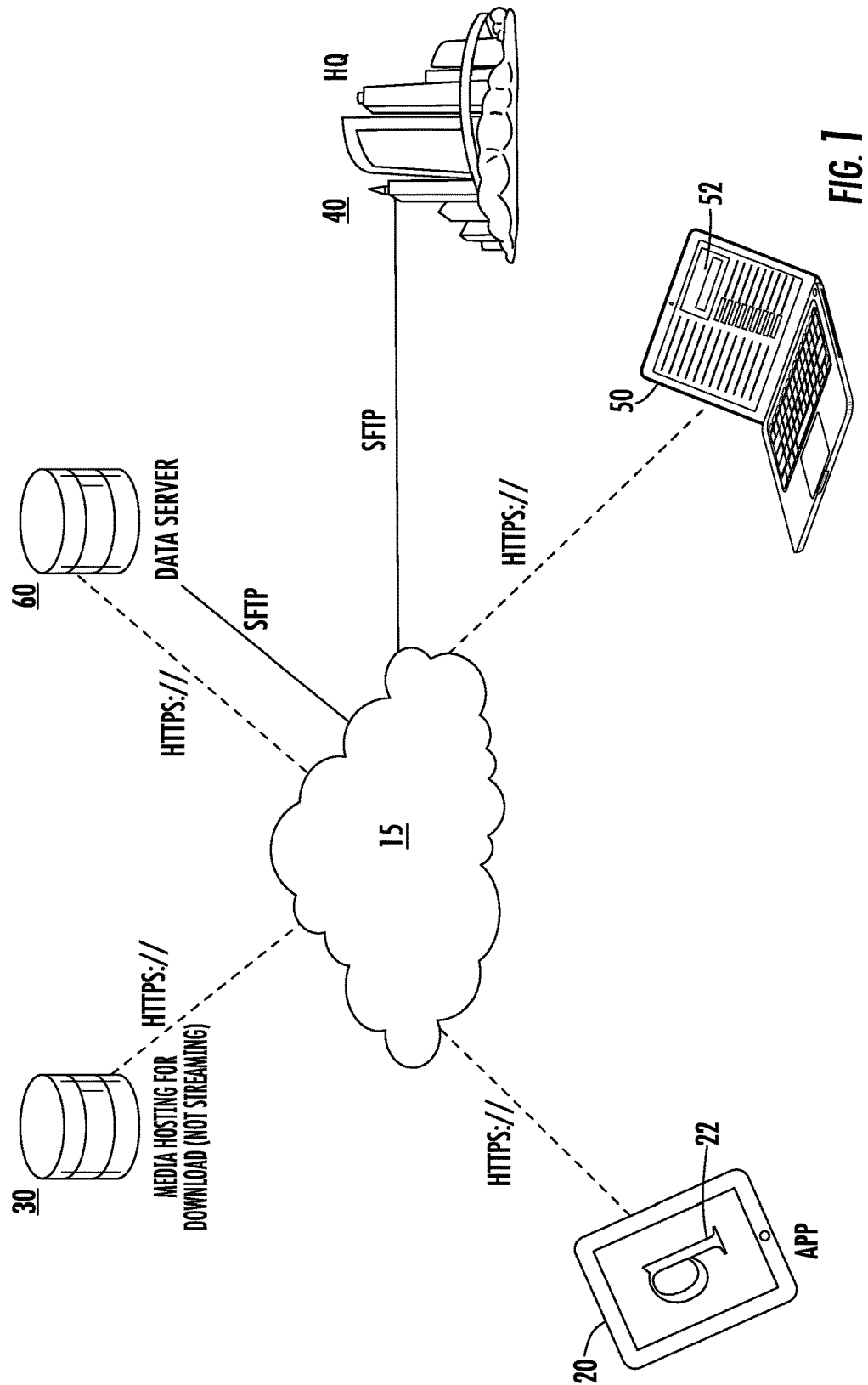
FIG. 1 is an overall schematic of a remote device content management system in accordance with the invention.
Figure 2:
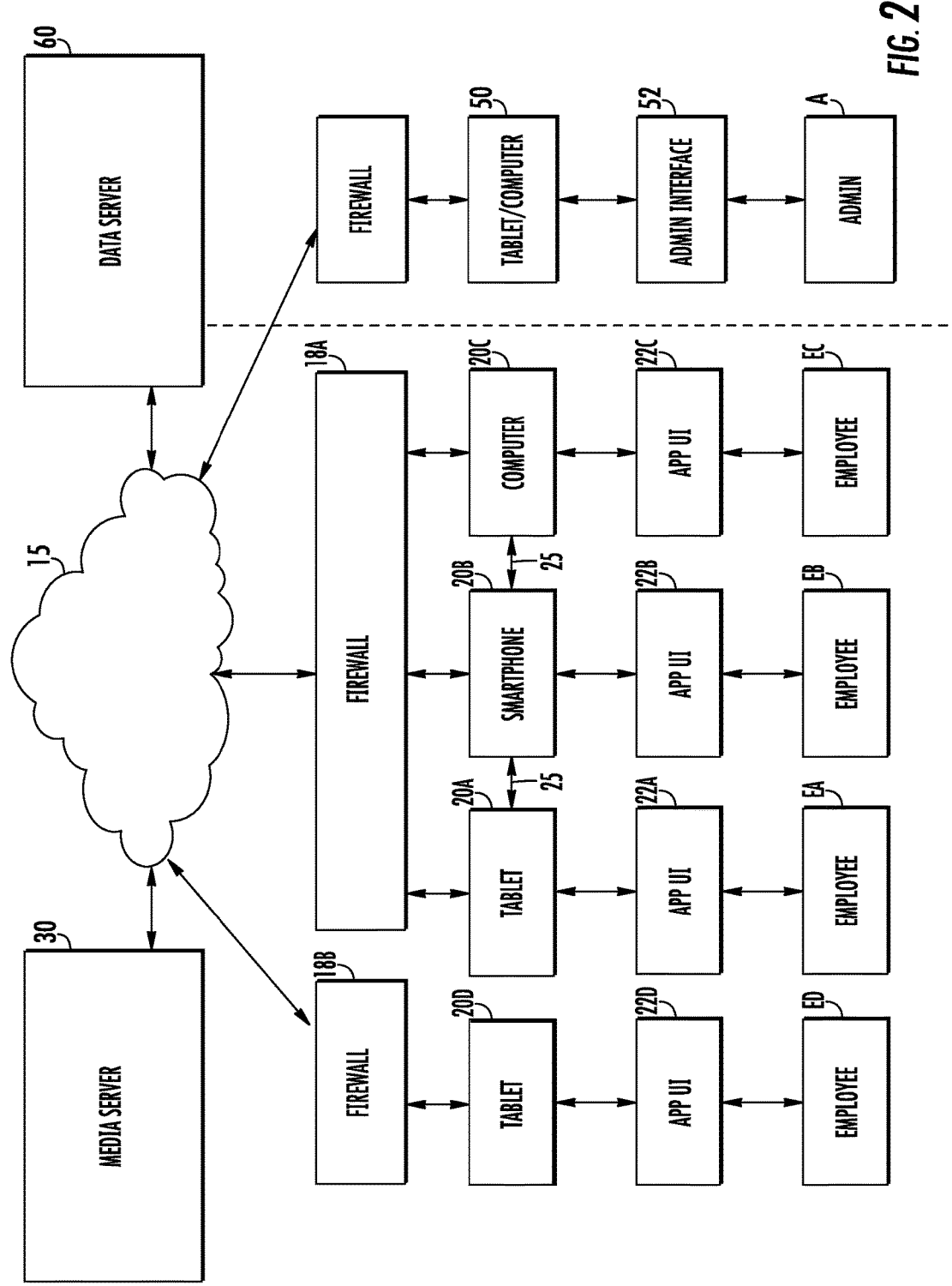
FIG. 2 is a schematic flow chart of a remote device content management system in accordance with the invention.

An overview of the inventive system 10 is shown in high level in FIG. 1 and with additional detail in FIG. 2. It should be understood that the invention contemplates a hosted system in which several entities share various responsibilities and components of the system to achieve the end result.

The chief and typical components of system 10 communicate through the cloud 15 and include the following. End user electronic devices 20, such as tablets, smartphones, desktop computers, and the like, allow end users such as corporate employees access to the system 10 and the ability to review and (preferably interact with) locally downloaded corporate content via a local program such as an app 22 (to be discussed in greater detail below in connection with FIGS. 3A-G). Depending on the identity of the end user/employee, different content may be viewable. This may depend on the end user's function, rank, seniority, class, division, location (specific store/office, region, country, etc.) previous progress with the materials, and other variables.

At least one media server 30 (e.g., as provided by Akamai of Cambridge, Mass. or Amazon Web Services, Inc. of Seattle, Wash.) is provided for hosting and downloading high bandwidth corporate content such as videos, PowerPoint presentations, large PDF documents, and other large files that would be inconvenient to stream.

Corporate server 40 includes human resources servers or similar data stores maintain data files concerning the various end users who will access the system via electronic devices 20 and app 22. Each end user is preferably provided with a unique user ID so that each end user can be granted different degrees of access to the corporate content as needed, and so that each end user's progress through the corporate content can be tracked via data server 60 (discussed below). Groups of user IDs can be classified by seniority, rank, class, division, location, function, and many other variables. These are typically transferred to the system via a secure file transfer protocol (SFTP) periodically, e.g., daily, hourly, or the like.

Administrators can access system 10 via electronic device 50 and administrative interface 52. Either in addition or in the alternative to employee app 22, administrators access system 10 to retrieve information about the progress of various employees or other end user in their respective interactions with the content via an administrative interface (to be discussed in greater detail below in connection with FIGS. 4A-D). In this way, administrators can review how employees are doing in their interactions with corporate content, e.g., how many segments/chapters of the content have been viewed, the success rate of employees on any quizzes or tests associated with the corporate content, any questions posed back to the system by the employees, and the like. Such employee progress can be reviewed on a number of different levels, including per employee, per location, region, country, class or division of employee, or the like.

The sortable employee data is stored and manipulatable on a server, either such as corporate server 40 or more preferably on a separate hosted employee data server 60 (see FIG. 2). Data server 60 operates to keep track of each end user's progress with the corporate content so that each end user can resume review of the corporate content regardless of which device s/he picks up at any given time. In other words, by storing the end user's progress centrally, the end user is not tied to a specific device 20 and can review/train with the corporate content any time or anywhere convenient (as long as the content itself is downloaded to the new device). Data server 60 also enables administrators to parse out the collected data about the end users and chart/track their respective progress.

As shown in greater detail in FIG. 2, each end user such as employees EA, EB, EC, and ED has access system 10 via an electronic device, such as tablet 20A, smartphone 20B, laptop or desktop computer 20C, tablet 20D (at a second location), or the like. Each device 20A-D accesses media server 30 to download corporate content via the cloud 15, optionally through a firewall 18A-B. Because devices 20A-C are in the same location, all of devices 20A-C access the system via the same firewall 18A. Large-sized corporate content is not streamed from media server 30 to devices 20A-C; that would require significant bandwidth infrastructure that simply is not warranted for this system. Instead, corporate content is downloaded prior to the user viewing the content, e.g., a little at a time when the device is not in use but when the device has an internet connection, or upon a user initiating a program that has not been seen on that device before, or the like. Each device 20A-D has an instance of a computer executable program 22(A-D) such as an app or similar software adapted to play the content. So, as a non-limiting example, if the corporate content includes video, app 22(A-D) includes a video player. If the corporate content includes a PowerPoint deck of slides, app 22(A-D) includes PowerPoint in one form or another, or a program that can view PowerPoint slides. App 22(A-D) of course has a user interface that enables end users EA-ED to view and otherwise interact with the downloaded corporate content. Typical devices 20A-D include a touch screen and/or a keyboard or similar means for enabling the user to interact with the device and thus app 22(A-D), though the invention contemplates any and all user interfaces, such as motion-based, gesture-based, vision/eye-position-based, and the like.

App 22(A-D) includes a comparator adapted to compare the downloaded corporate content on respective devices 20A-D to the central corporate content on media server 30 to determine the currentness of the local content with respect to the central content. In addition or in the alternative, the comparison need not be made between the local content on devices 20A-D and that of media server 30 but could instead be made between the local content on devices 20A-D and another element in the system. App 22(A-D) also includes an updater for updating the local corporate content if the local corporate content is determined to be not current with respect to the central corporate content. App 22(A-D) will download newer content from media server 30 to the local device 20A-D.

One way by which app 22(A-D) compares and updates local content with respect to central content is by use of manifest files. A central manifest file corresponds to the central corporate content, and a local manifest file resident on the local electronic device corresponds to the local corporate content resident on the local device 20A-D. The comparator compares the local manifest file to the central manifest file to determine the currentness of the local content with respect to the central content. Preferably, the comparator compares the local manifest file to the central manifest file whenever a user logs into the computer executable program on the local electronic device. In addition or in the alternative, the comparator compares the local manifest file to the central manifest file periodically. The central manifest file preferably includes metadata related to the central high bandwidth content and the local manifest file comprising metadata related to the local high bandwidth content. In very general terms, app 22(A-C) looks to media server 30 to see if there is updated content. If there is updated content on media server 30, app 22(A-C) pulls the update. If not, app 22(A-C) just plays local content.

In one embodiment of the invention, the manifest file includes XML, JSON, or similar data that provides information on every file within the corporate content. Every file may be listed with one or more of the following: a) the file name, including its directory placement within the app's file structure; b) a language code to indicate which language the file may need to be associated with (Spanish files would be different from English files, etc., though they represent the same content); c) an unlock date, if the updater should hold off on downloading the file until the date has been reached; d) an update date, which indicates the last time the file was modified. Other file metadata may include file size, creation and modified date/time, and/or any other information that would be used to distinguish a file's version from any other version. File size can also be useful to keep a tally on how much data is being used for a program. File size limitations may be set per program, so that users creating programs on the system (e.g., subdivisions of a corporate client) could not upload more than the allotted total file size.

When a user logs in via the app, as part of the data that is returned from the login process, the app will receive a URL to the directory of data server 60 location of the app's content. (The data server 60's URL may alternatively be hard-coded into the app.) Upon login to an app, a locally stored copy of the manifest file is compared against one on data server 60. If any variations in the file data exists between the local and remote versions (based on the criteria previously listed), the mismatched file is added to a list of files to be downloaded. Any outdated files existing locally, which are to be replaced by newer versions from data server 60, are first deleted from the app's directory before the newer files are downloaded. By first deleting all local files which require updating, the app downloads any files that are missing. Thus, should any files be missing, even though the local and remote manifest files may match, the app can download all files that are required. This allows the app to resume downloading files even if the app is quit during the update process.

The corporate content may include primary content and secondary content, and a plurality of files of the secondary content may correspond to a single file of the primary content. As an example, the primary content includes video files or other large/high bandwidth files such as PowerPoint presentations or high resolution PDF documents, and the secondary content includes at least one of i) a plurality of audio files corresponding to the video files or ii) a plurality of text files corresponding to the video files. App 22(A-C) preferably includes a secondary content selector. Depending on which setting is selected in the secondary content selector, at least one of the plurality of files of the secondary content is downloaded to the local electronic device to correspond to the primary content file. As an example, each of the plurality of files of the secondary content may be in a different language, and the secondary content selector selects which language to download. Other variations of primary versus secondary content are contemplated, such as differently branded versions (secondary content) of the same large size/high bandwidth program (primary content).

In addition to receiving content from system 10 via file transfer protocols from media server 30, end user electronic devices 20 can receive content from each other via local communication links 25 (see FIG. 2). One device, e.g., tablet 20A, can compare its content manifest file against the content manifest file of another device, e.g., smartphone 20B or computer 20C. The device with the most up-to-date content (as defined, e.g., by metadata associated with the file contents) can serve as a local version of media server 30 and provide the delta in content to the less up-to-date devices. Such local updates can be performed wirelessly via Wi-fi, a local area network, near field communication, Bluetooth connections, socket connections, and the like.

Over on the administrative side of the system, administrator A can access the system via an administrative computer executable program (e.g., app or software) 52 on electronic device 50. In addition or in the alternative to the access provided by app 22, app 52 enables administrator A to access the progress records of the various employees as they go through the corporate content. App 52 enables administrator A to drill down into and parse employee progress on a number of different levels: by content section, by employee, by region, by location, by question (if questions to be answered are included), or the like. As mentioned before, this type of progress data is stored on data server 60. Alternatively or in addition, this type of progress data may be stored on corporate server 40 (see FIG. 1).

Figure 3C:
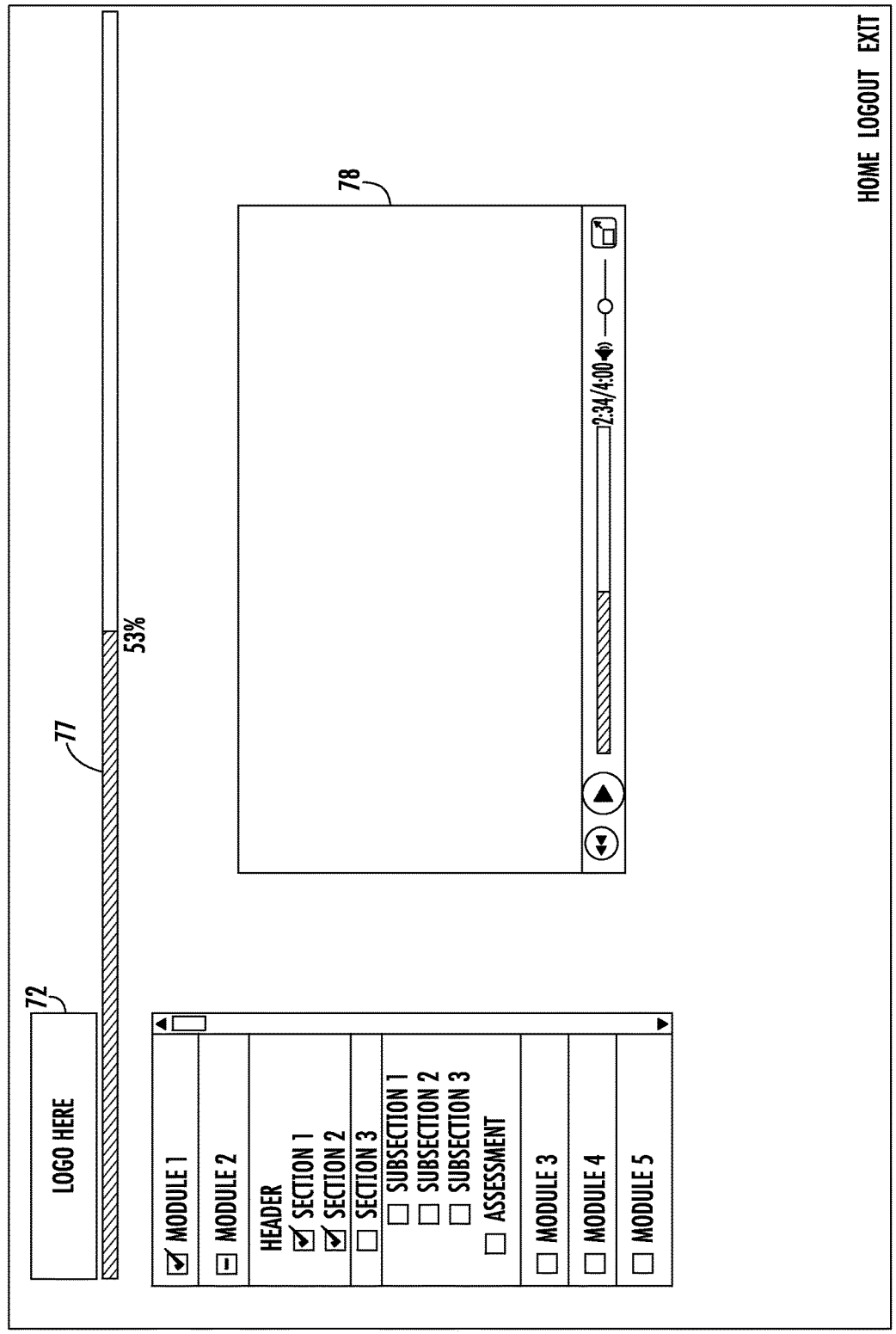

Description of the operation of the invention by way of exemplary screen shots of app 22 is provided here with reference to FIGS. 3A-G. First, the end user/employee seeking to access the corporate content, in this case an employee training video, logs into the system via the login screen at FIG. 3A. As an option, app 22 may enable the selection of a different language with language toggle 71. Corporate identifier 72 is provided to ensure the end user is viewing the correct content and to reinforce the brand on the viewer. (Of course, the entire interface can be customized and formatted to create brand immersion and recognition.) Upon successful logging into the app by providing the unique end user ID and password, the end user is directed to the main menu as shown in FIG. 3B. The exemplary menu depicts the programs 74 that the end user is qualified to view, the progress 75 of what programs have been viewed, and optionally subsections or modules 76 that the end user has completed or is next slated to complete.

Figure 3D:
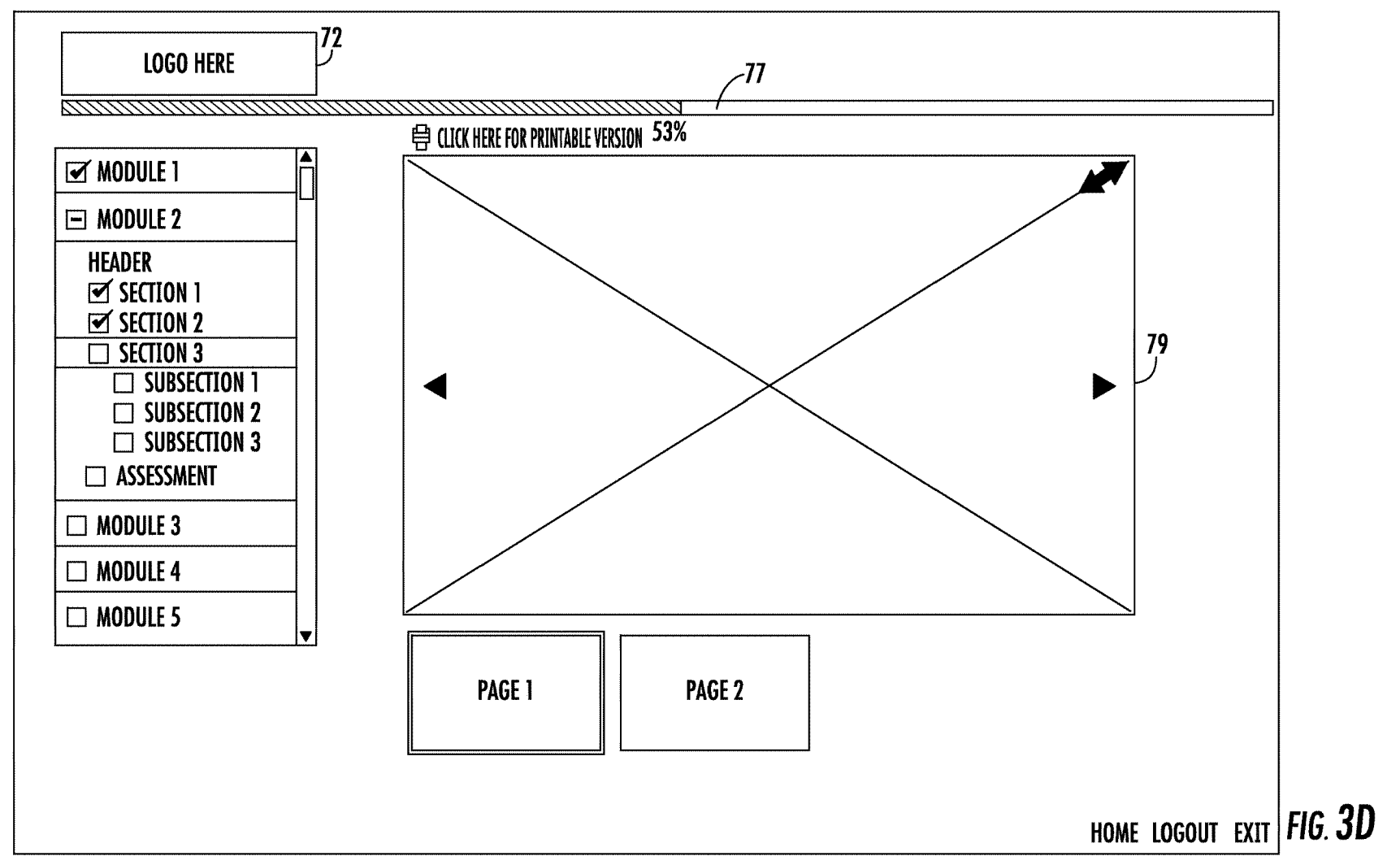

Upon selecting the next available program (or one of several available programs), app 22 takes the end user to a program viewing screen, such as the video viewing screen of FIG. 3C or the slide viewing screen of FIG. 3D. In either case, the end user watches the video on video box 78 or reviews the slides in slide box 79. Progress is shown via progress bar 77 as is known in the art. Other forms of media, e.g., PDF or JPEG documents or the like, are also contemplated as being viewable as corporate content via app 22.

Upon completing a program, or a module, or one or more sections or subsections of a module, the end user may be alerted by the system that s/he is supposed to take a quiz or test on the materials by alert box 80 as shown in FIG. 3E. The quiz can be integral with the corporate content previously downloaded, or it can be accessed later, depending on the needs or desires of the corporate clients of the system. Other variations are contemplated. In any event, when the end user begins the quiz, a question (or the like) 81 is displayed as shown in FIG. 3F. The exemplary question shown is a multiple choice question, so a series of choices 82 are provided. In addition or in the alternative, a free form text box 83 can be presented, either for comments about the question, or for an answer to a "fill in the blank" type question, or for feedback to administration or other end users, or other reasons. Finally, upon completing the quiz, the user's score may be provided as shown in FIG. 3G. The results of the end user's progress—including what programs, modules, etc. were viewed and the results of the quiz—are transmitted to system 10, e.g., to data server 60 or corporate server 40, or a similar device. Progress/quiz results may be transmitted during the use of app 22, at the completion of program/module, etc., at the completion of an assessment or quiz, upon logging out of app 22, and/or at other times.

Figure 4A:
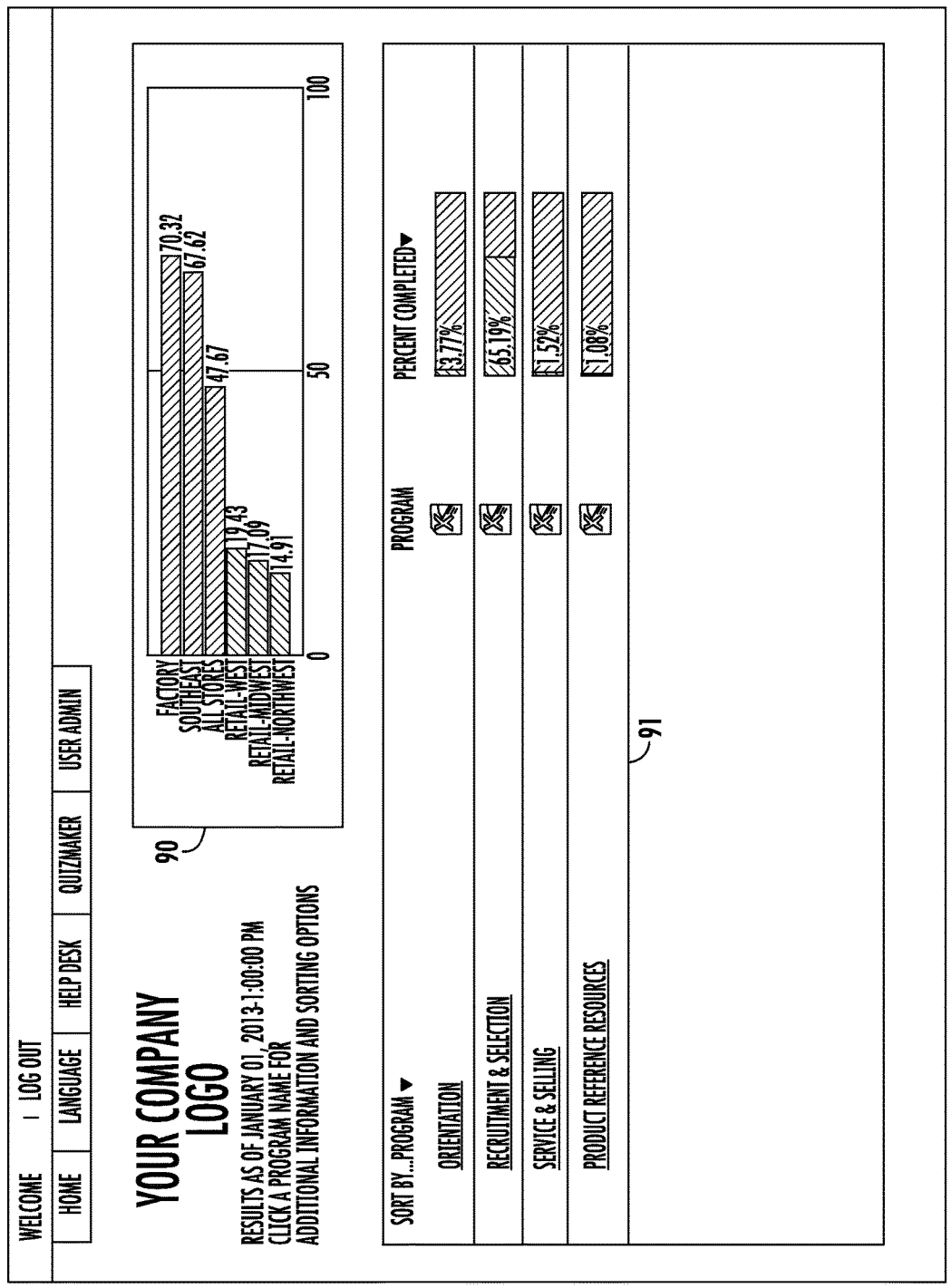
Figure 4B:
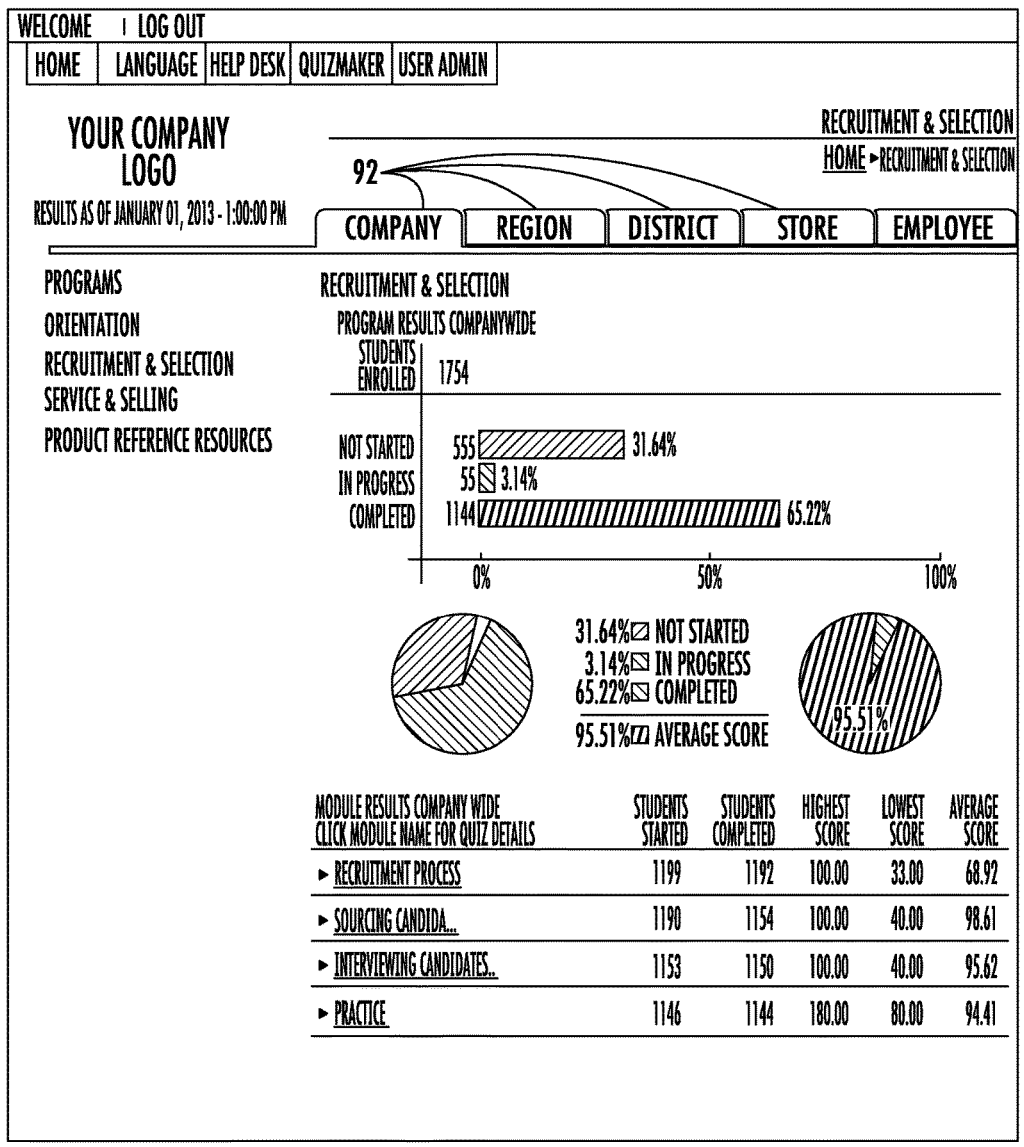
Figure 4C:
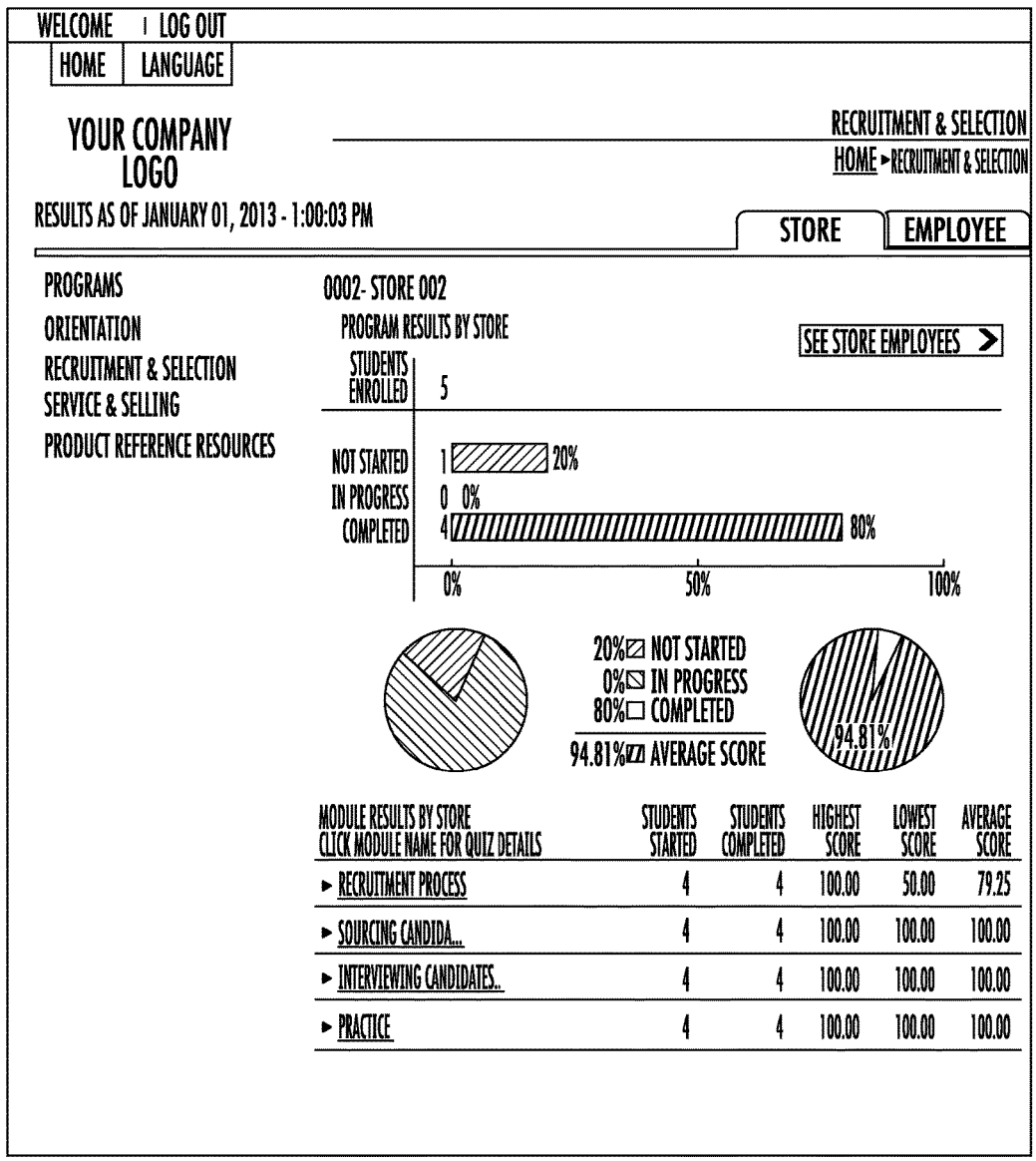

The administrator is able to access the collated results of all end users'/employees' progress through the corporate content, as depicted in an exemplary manner in FIGS. 4A-D. In FIG. 4A, the administrator is presented with overall picture of the progress of the company's end users through various programs of the corporate content. As shown above in box 90, progress is broken down by region and/or location or type of location (factory versus stores, geographical areas, etc.). Below, in section 91, progress is depicted broken down by program. Upon selecting one such program, e.g., "Recruitment & Selection", the administrator is directed to the screen of FIG. 4B, which breaks down the results of this particular program. Tabs 92 are provided to select different parsing levels of the data, e.g., company-wide, region-wide, district-wide, store-wide, and per employee. For example, in FIG. 4B, a company-wide data set is shown, whereas in FIG. 4C, a store-wide data set is shown. Lastly, as shown in FIG. 4D, the results of a specific end user/employee are displayed. Certain tabs/data may only be made available to certain levels of administrators; i.e., location managers may only have access to data related to their specific locations, whereas regional managers would have access to the entire region and executive level managers would have access to more/all data.

Figure 5:
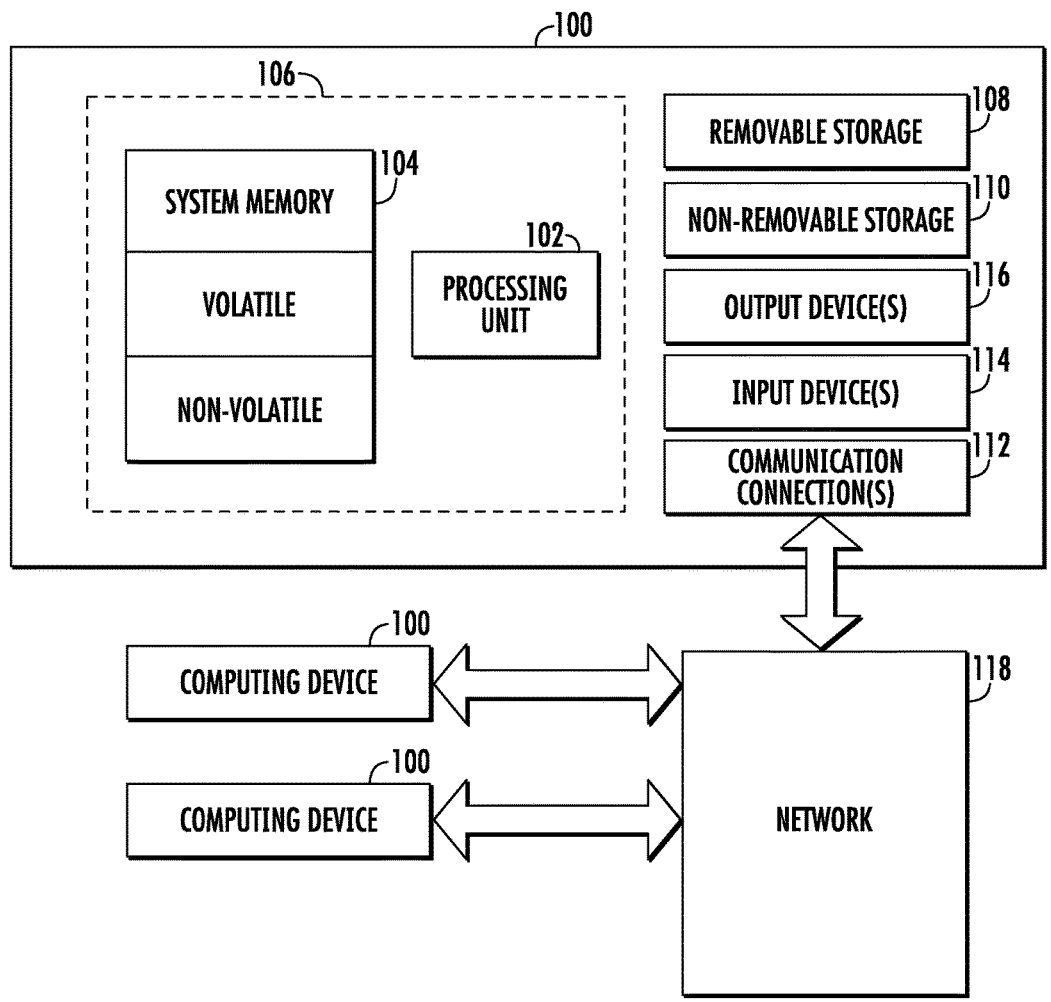
FIG. 5 is a block diagram of an exemplary computing environment within which various embodiments of the invention may be implemented.

FIG. 5 depicts an exemplary computing environment in which various embodiments of the invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 5 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 5 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 inter-connected by a network 118, as is shown in FIG. 5. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as USB flash drives, SD cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A remote learning management system (LMS) for distributing, administering, and tracking of content, providing centrally updatable digital content on local electronic devices, each user having a unique user identifier, comprising:
    at least one media server having central high bandwidth content resident thereon;
    at least one local electronic device at least intermittently able to communicate with said media server, adapted to be populatable with said central high bandwidth content as an instance of local high bandwidth content and user-interactive content via downloading, and having a user interface and a computer executable program to play said instance of local high bandwidth content for a user via said user interface and to enable user-interaction with said user-interactive content,
    said computer executable program further comprising:
        a comparator adapted to compare said instance of local high bandwidth content to said central high bandwidth content to determine the currentness of said instance of local high bandwidth content with respect to said central high bandwidth content; and
        an updater for updating said instance of local high bandwidth content if said instance of local high bandwidth content is determined to be not current with respect to said central high bandwidth content via said computer executable program downloading newer content from said media server to said local electronic device; and
    a second admin server able to communicate with said local electronic devices and receiving said user identifier and said response to said interactive content,
    wherein users of said remote learning management system (LMS) access said instance of local high bandwidth content via said user interface and thus conserve local connectivity bandwidth, and
    wherein when a user provides a response to said interactive content, said user identifier and said response are communicated to said system and
    wherein said central high bandwidth content comprises primary content and secondary content.

2. A remote learning management system (LMS) for distributing, administering, and tracking of content, providing centrally updatable digital content on local electronic devices according to claim 1, each of the users providing at least one of said response to said interactive content to form a plurality of said responses, wherein said second admin server comprises a computer executable results program adapted to tally and sort said plurality of said responses received from the users.

3. A remote learning management system (LMS) for distributing, administering, and tracking of content, providing centrally updatable digital content on local electronic devices according to claim 1, said system comprising a plurality of said local electronic devices each having one of a respective plurality of said computer executable programs and each respectively populated with an instance of said central high bandwidth content as local high bandwidth content and each of said plurality of said local electronic devices being respectively provided to or associated with different users, a first one of said plurality of local electronic devices being locally able to communicate with a second one of said plurality of local electronic devices and being able to update a first instance of said local high bandwidth content on said first one of said plurality of local electronic devices from a second instance of said local high bandwidth content on said second one of said plurality of local electronic devices.

4. A remote learning management system (LMS) for distributing, administering, and tracking of content, providing centrally updatable digital content on local electronic devices according to claim 1, wherein said system makes only a portion of said local high bandwidth content available to a given user based on the user's said unique identifier.

5. A remote learning management system (LMS) for distributing, administering, and tracking of content, providing centrally updatable digital content on local devices according to claim 1, further comprising:
    a central manifest file corresponding to said central high bandwidth content; and
    a local manifest file resident on said local electronic device, corresponding to said instance of local high bandwidth content resident on said local electronic device,
    wherein said comparator compares said local manifest file to said central manifest file to determine the currentness of said instance of local high bandwidth content with respect to said central high bandwidth content.

6. A remote learning management system (LMS) for distributing, administering, and tracking of content, providing centrally updatable digital content on local electronic devices according to claim 5, wherein said comparator compares said local manifest file to said central manifest file at least one of i) whenever a user logs into said computer executable program on said local electronic device, or ii) periodically.

7. A remote learning management system (LMS) for distributing, administering, and tracking of content, providing centrally updatable digital content on local electronic devices according to claim 5, said central manifest file comprising metadata related to said central high bandwidth content and said local manifest file comprising metadata related to said instance of local high bandwidth content.

8. A remote learning management system (LMS) for distributing, administering, and tracking of content, providing centrally updatable digital content on local electronic devices according to claim 1, wherein a plurality of files of said secondary content corresponds to a single file of said primary content.

9. A remote learning management system (LMS) for distributing, administering, and tracking of content, providing centrally updatable digital content on local electronic devices according to claim 8, wherein said primary content comprises video files and said secondary content comprises at least one of i) a plurality of audio files corresponding to said video files or ii) a plurality of text files corresponding to said video files.

10. A remote learning management system (LMS) for distributing, administering, and tracking of content, providing centrally updatable digital content on local electronic devices according to claim 9, said computer executable program further comprising a secondary content selector, wherein depending on which setting is selected in said secondary content selector, at least one of said plurality of files of said secondary content is downloaded to said local electronic device to correspond to said primary content file.

11. A remote learning management system (LMS) for distributing, administering, and tracking of content, providing centrally updatable digital content on local electronic devices according to claim 1, said system making only a portion of said local high bandwidth content available to a given user based on the user's viewing progress of said local high bandwidth content.

12. A remote learning management system (LMS) for distributing, administering, and tracking of content, providing centrally updatable digital content on local electronic devices according to claim 11, wherein said system determines the user's viewing progress of said instance of local high bandwidth content based at least in part on the user's said unique identifier, said second admin server receiving from said local electronic devices an indication of each user's viewing progress of said local high bandwidth content.

13. A method of providing centrally updatable digital content on local electronic devices via a remote device content and learning management system (LMS) for distributing, administering, and tracking of content, comprising the steps of:
 providing each user with a unique user identifier;
 providing at least one media server having central high bandwidth content resident thereon;
 providing at least one local electronic device at least intermittently able to communicate with the media server, adapted to be populatable with the central high bandwidth content as an instance of local high bandwidth content via downloading, and having a user interface and a computer executable program to play the instance of local high bandwidth content for a user via the user interface;
 comparing the local high bandwidth content to the central high bandwidth content and determining the currentness of the instance of local high bandwidth content with respect to the central high bandwidth content;
 updating the instance of local high bandwidth content if the instance of local high bandwidth content is determined to be not current with respect to the central high bandwidth content via downloading newer content from the media server to the local electronic device;
 enabling users of the remote device content and learning management system to access the instance of local high bandwidth content via the user interface and thus conserve local connectivity bandwidth;
 providing interactive content as part of the instance of local high bandwidth content to which a user can provide a response;
 communicating the unique identifier and the response to the system upon a user providing the response to the interactive content; and
 providing a second admin server able to communicate with the local electronic devices and receiving the user identifier and the response to the interactive content,
 wherein said central high bandwidth content comprises primary content and secondary content.

14. A method of providing centrally updatable digital content on local electronic devices via a remote device content and learning management system (LMS) for distributing, administering, and tracking of content according to claim 13, a plurality of the users each providing at least one response to the interactive content to form a plurality of the responses, further comprising the step of tallying and sorting the plurality of the responses received from the users.

15. A method of providing centrally updatable digital content on local electronic devices via a remote device content and learning management system (LMS) for distributing, administering, and tracking of content according to claim 13, further comprising the steps of providing a plurality of the local electronic devices able to communicate with each other; and
 enabling at least one of the plurality of the local electronic devices to update its instance of local high bandwidth content from another of the local electronic devices.

16. A method of providing centrally updatable digital content on local electronic devices via a remote device content and learning management system (LMS) for distributing, administering, and tracking of content according to claim 13, further comprising the step of making only a portion of the instance of local high bandwidth content available to a given user based on the user's unique identifier.

17. A method of providing centrally updatable digital content on local electronic devices via a remote device content and learning management system (LMS) for distributing, administering, and tracking of content according to claim 13, further comprising the step of comparing a local manifest file corresponding to the instance of local high bandwidth content resident on the local electronic device to a central manifest file corresponding to the central high bandwidth content to determine the currentness of the instance of local high bandwidth content with respect to the central high bandwidth content.

18. A method of providing centrally updatable digital content on local electronic devices via a remote device content and learning management system (LMS) for distributing, administering, and tracking of content according to claim 17, wherein said comparing of the manifest files step is performed at least one of i) whenever a user logs into the computer executable program on the local electronic device, or ii) periodically.

19. A method of providing centrally updatable digital content on local electronic devices via a remote device content and learning management system (LMS) for distributing, administering, and tracking of content according to claim 13, further comprising the step of providing a plurality of files of the secondary content corresponding to a single file of the primary content.

20. A method of providing centrally updatable digital content on local electronic devices via a remote device content and learning management system (LMS) for distributing, administering, and tracking of content according to claim 19, further comprising the steps of:
 providing video files as the primary content; and
 providing at least one of i) a plurality of audio files corresponding to the video files or ii) a plurality of text files corresponding to the video files as the secondary content.

21. A method of providing centrally updatable digital content on local electronic devices via a remote device content and learning management system (LMS) for distributing, administering, and tracking of content according to claim 20, further comprising the step of selecting at least one of the plurality of files of the secondary content to be downloaded to the local electronic device to correspond to the primary content file.

22. A method of providing centrally updatable digital content on local electronic devices via a remote device content and learning management system (LMS) for distributing, administering, and tracking of content according to claim 13, further comprising the step of making only a portion of the local high bandwidth content available to a given user based on the user's viewing progress of the local high bandwidth content.

23. A method of providing centrally updatable digital content on local electronic devices via a remote device content and learning management system (LMS) for distributing, administering, and tracking of content according to claim 22, further comprising the step of determining the user's viewing progress of the local high bandwidth content based at least in part on the user's unique identifier.

24. A method of providing centrally updatable digital content on local electronic devices via a remote device content and learning management system (LMS) for distributing, administering, and tracking of content according to claim 23, further comprising the step of communicating each user's viewing progress of the local high bandwidth content to the second server and associating each user's viewing progress with each user's respective unique identifier.

25. A method of providing centrally updatable digital content on local electronic devices via a remote device content and learning management system (LMS) for distributing, administering, and tracking of content according to claim 22, wherein the step of making only a portion of the instance of local high bandwidth content available is dependent on the user's viewing progress independently of a specific local electronic device.

* * * * *